(12) United States Patent
Zhu et al.

(10) Patent No.: US 7,821,228 B2
(45) Date of Patent: Oct. 26, 2010

(54) MOBILE PHONE CHARGER

(75) Inventors: Qiang Zhu, Shenzhen (CN); Shan-Ming Liao, Shenzhen (CN)

(73) Assignees: Hong Fu Jin Precision Industry (ShenZhen) Co., Ltd., Shenzhen, Guangdong Province (CH); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 468 days.

(21) Appl. No.: 11/946,861

(22) Filed: Nov. 29, 2007

(65) Prior Publication Data

US 2009/0039829 A1   Feb. 12, 2009

(30) Foreign Application Priority Data

Aug. 9, 2007   (CN) .................... 2007 1 0201317

(51) Int. Cl.
*H02J 7/00* (2006.01)
(52) U.S. Cl. .................... 320/114; 320/103; 320/112
(58) Field of Classification Search ............... 320/103, 320/112, 114
See application file for complete search history.

(56) References Cited

U.S. PATENT DOCUMENTS 5,637,978 A * 6/1997 Kellett et al. ............ 320/104
5,717,308 A * 2/1998 Nishitani et al. ......... 396/279
2002/0190691 A1* 12/2002 Chen ........................ 320/114
2004/0046673 A1* 3/2004 Kovarik et al. .......... 340/636.1
2005/0189913 A1* 9/2005 Vitanov et al. ............ 320/114

* cited by examiner

*Primary Examiner*—Edward Tso
*Assistant Examiner*—Samuel Berhanu
(74) *Attorney, Agent, or Firm*—Frank R. Niranjan

(57) ABSTRACT

A charger includes a battery module, a boosting and charging circuit, a low voltage boosting circuit, and a charging interface. The battery module provides an operating voltage for the boosting and charging circuit and the low voltage boosting circuit. When the operating voltage is greater than a reference voltage of the boosting and charging circuit, the boosting and charging circuit module works and outputs a charging voltage to the charging interface. When the operating voltage is smaller than the reference voltage of the boosting and charging circuit but greater than a starting voltage of the low voltage boosting circuit, the low voltage boosting circuit works and boosts the operating voltage to the boosting and charging circuit, and then the boosting and charging circuit module works and outputs the charging voltage to the charging interface for the mobile phone.

11 Claims, 2 Drawing Sheets

MOBILE PHONE CHARGER

BACKGROUND

1. Field of the Invention

The present invention relates to a mobile phone charger.

2. Description of Related Art

At present, with the development of the telecommunications industry, mobile phones have brought great convenience for people's life and work. However, after using the mobile phones for a period of time, they need charging. Generally, 110V AC will be converted to 5V DC to charge a lithium battery for a mobile phone, which inconveniently limits charging of a mobile phone to a fixed place with AC access.

What is desired, therefore, is to provide a mobile phone charger that uses batteries.

SUMMARY

In one embodiment, a mobile phone charger includes a battery module, a boosting and charging circuit, a low voltage boosting circuit, and a charging interface for a mobile phone. The battery module provides an operating voltage for the boosting and charging circuit and the low voltage boosting circuit. When the operating voltage is greater than a reference voltage of the boosting and charging circuit, the boosting and charging circuit outputs a charging voltage to the charging interface for the mobile phone. When the operating voltage is smaller than the reference voltage of the boosting and charging circuit but greater than a starting voltage of the low voltage boosting circuit, the low voltage boosting circuit works and boosts the operating voltage to the boosting and charging circuit, and then the boosting and charging circuit outputs the charging voltage to the charging interface for the mobile phone.

Other advantages and novel features of the present invention will become more apparent from the following detailed description of preferred embodiment when taken in conjunction with the accompanying drawings, in which:

DETAILED DESCRIPTION

Figure 1:
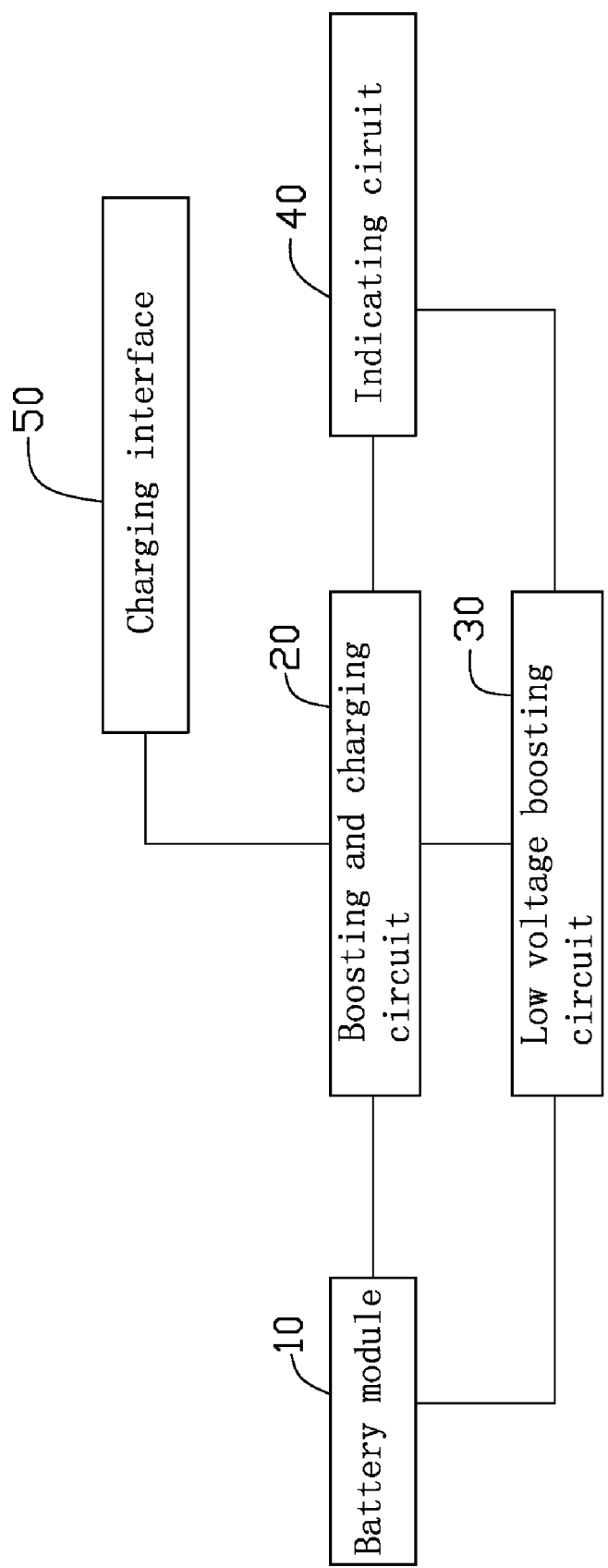
FIG. 1 is a block diagram of a mobile phone charger in accordance with an embodiment of the present invention.
Figure 2:
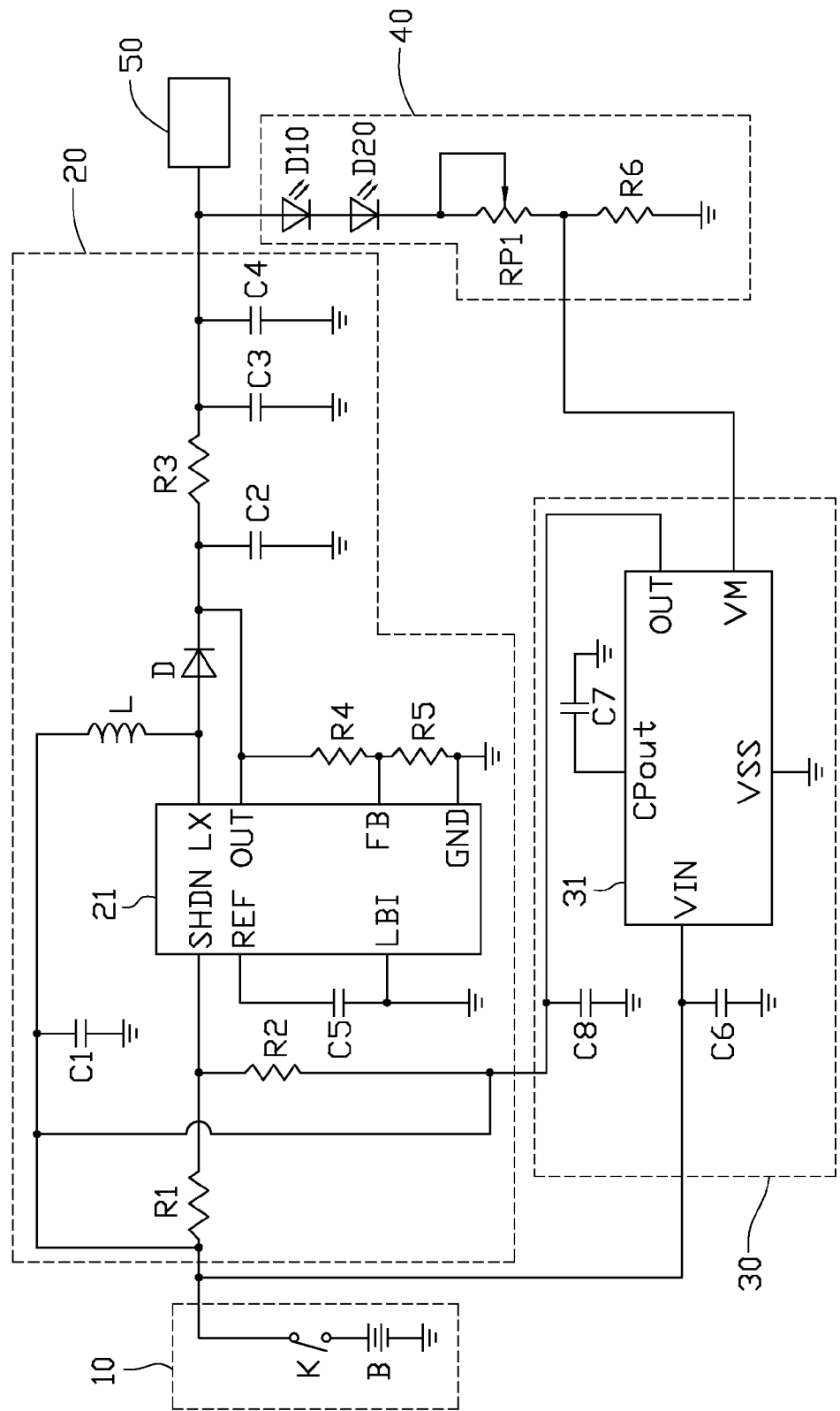
FIG. 2 is a circuit diagram of the mobile phone charger of FIG. 1.

Referring to FIG. 1 and FIG. 2, a mobile phone charger in accordance with an embodiment of the present invention includes a battery module 10, a boosting and charging circuit 20, a low voltage boosting circuit 30, an indicating circuit 40, and a charging interface 50. The battery module 10 is connected to the boosting and charging circuit 20 and low voltage boosting circuit 30. The boosting and charging circuit 20 is connected to the low voltage boosting circuit 30, the indicating circuit 40 and the charging interface connector 50. The low voltage boosting circuit 30 is connected to the instruction module 40. Above components can be placed in a shell (not shown). Size and shape of the shell can be designed according to need.

The battery module 10 includes a battery group B with a voltage of, for example 0.3V~6V, and a switch K. One end of the switch K is connected to the positive terminal of the battery group B, the other end of the switch K is connected to the boosting and charging circuit 20 and the low voltage boosting circuit 30, and the negative terminal of the battery group B is grounded. The battery group B can include one or more batteries.

The boosting and charging circuit 20 includes first~fifth resistors R1~R5, first~fifth capacitors C1~C5, an inductor L, a DC-DC converter chip 21, and a diode D. The DC-DC converter chip 21 includes an input terminal SHDN, an inductance terminal LX, an output terminal OUT, a feedback terminal FB, a ground terminal GND, a reference voltage terminal REF, and a low voltage input terminal LBI. The other end of the switch K of the battery module 10 is connected to the input terminal SHDN of the DC-DC converter chip 21 via the first resistor R1, and grounded via the first capacitor C1, and connected to the inductance terminal LX of the DC-DC converter chip 21 via the inductor L. The input terminal SHDN of the DC-DC converter chip 21 is connected to the low voltage boosting circuit 30 via the second resistor R2. The inductance terminal LX of the DC-DC converter chip 21 is connected to the anode of the diode D. The cathode of the diode D is connected to the charging interface 50 via the third resistor R3, and to the output terminal OUT of the DC-DC converter chip 21. The cathode of the diode D is also grounded via the second capacitor C2, and the charging interface 50 is grounded via the third capacitor C3 and the fourth capacitor C4. The output terminal OUT is grounded via the fourth resistor R4 and fifth resistor R5 connected in series. The feedback terminal FB is connected to a node between the fourth resistor R4 and fifth resistor R5. The reference voltage terminal REF is grounded via the fifth capacitor C5. The low voltage input terminal LBI and the ground terminal GND are grounded. The first capacitor C1 and the inductor L make up a storage circuit. The second capacitor C2, the third capacitor C3, and the fourth capacitor C4 are used for filtering. In this embodiment the type of the DC-DC converter chip 21 is MAX757.

The low voltage boosting circuit 30 includes a DC step-up chip 31, and sixth~eighth capacitors C6~C8. The DC step-up chip 31 includes a voltage input terminal VIN, an output terminal OUT, a starting capacitor terminal CPout, and a voltage control terminal VM. The voltage input terminal VIN of the DC step-up chip 31 is connected to the other end of the switch K of the battery module 10 and grounded via the sixth capacitor R6. The output terminal OUT of the DC step-up chip 31 is connected to the other end of the switch K and the input terminal SHDN of the DC-DC converter chip 21 via the second resistor R2, and grounded via the eighth capacitor C8. The starting capacitor terminal CPout of the DC step-up chip 31 is grounded via the seventh capacitor C7. The voltage control terminal VM of the DC step-up chip 31 is connected to the indicating circuit 40. In this embodiment the type of the DC step-up chip 31 is 31-S-M5T1G 882Z20.

The indicating circuit 40 includes two light emitting diodes (LEDs) D10~D20, a variable resistor RP1, and a sixth resistor R6. The charging interface 50 is connected to the anode of the first LED D10, the cathode of the first LED D10 is connected to the anode of the second LED D20, the cathode of the second LED D20 is connected to one end of the variable resistor RP1, the other end of the variable resistor RP1 is connected to the voltage control terminal VM of the DC step-up chip 31 and grounded via the sixth resistor R6. Brightness of the first LED D10 and the second LED D20 can be controlled by adjusting the variable resistor RP1, to be used as power indicator lights indicating the charging status, or as emergency lights when needed.

When the mobile phone charger encloses the battery group B, and the switch K of the battery module 10 is closed, the mobile phone charger is initiated. When voltage of the battery group B of the battery module 10 is greater than a reference voltage (such as when the batteries are fully charged), for example 1.25V of the DC-DC converter chip 21, the boosting and charging circuit 20 outputs a 5V~8V charging voltage to the charging interface 50. When the voltage of the battery group B is less than the reference voltage (such as when batteries are no longer fully charged), of the DC-DC converter chip 21 but greater than a starting voltage, for example 0.3V of the DC step-up chip 31, the low voltage boosting circuit 30 outputs a 3V~5V voltage to an input terminal SHDN of the DC-DC converter chip 21, the boosting and charging circuit 20 then outputs a 5V~8V charging voltage to the charging interface 50 for the mobile phone. Thus, the present mobile phone charger can charge a mobile phone even when there is no AC access, and further can even charge the mobile phone when the batteries of the charger are low thanks to the low-voltage boosting circuit 30. The charging voltage turns on the LEDs D10 and D20, the number of the LEDs is not limited to two, and can be changed according to need.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile phone charger for charging a mobile phone, comprising:
   a battery module configured for receiving at least one battery therein, and providing an operating voltage from the at least one battery;
   a boosting and charging circuit comprising a DC-DC converter chip, an input terminal of the DC-DC converter chip receiving the operating voltage from the battery, when the operating voltage of the battery is substantially higher than a reference voltage of the DC-DC converter chip, the DC-DC converter chip being activated and raising the operating voltage, and an output terminal of the DC-DC converter chip outputting the raised operating voltage as a charging voltage;
   a low voltage boosting circuit comprising a DC step-up chip, a voltage input terminal of the DC step-up chip connected to a positive terminal of the at least one battery to receive the operating voltage therefrom when the operating voltage is substantially lower than the reference voltage and insufficient to activate the DC-DC converter chip, the DC step-up chip raising the low operating voltage to be substantially higher than the reference voltage and outputting the raised operating voltage to the input terminal of the DC-DC converter chip; and
   a mobile phone charging interface connected to the output terminal of the DC-DC converter chip to receive the charging voltage, and providing the charging voltage to the mobile phone.

2. The mobile phone charger as claimed in claim 1, further comprising:
   an indicating circuit comprising at least one light-emitting diode (LED), and a variable resistor, the anode of the LED connected to the output terminal of the DC-DC converter chip, the cathode of the LED grounded via the variable resistor.

3. The mobile phone charger as claimed in claim 2, wherein the indicating circuit further comprises a sixth resistor connected between the variable resistor and ground, a voltage control terminal of the DC step-up chip connected to a node between the variable resistor and the sixth resistor.

4. The mobile phone charger as claimed in claim 1, wherein the battery module further comprises a switch, one end of the switch is connected to the positive terminal of the battery, the other end of the switch is connected to the voltage input terminal of the DC step-up chip.

5. The mobile phone charger as claimed in claim 1, wherein the DC-DC converter chip has an inductance terminal, a diode has an anode connected to the inductance terminal of the DC-DC converter chip, and a cathode of the diode connected to the output terminal of the DC-DC converter chip.

6. The mobile phone charger as claimed in claim 1, wherein the boosting and charging circuit further comprises:
   first to fifth resistors, the first resistor connected between the voltage input terminal of the DC step-up chip and the input terminal of the DC-DC converter chip, the second resistor connected between the input terminal of the DC-DC converter chip and the output of the DC step-up chip, the third resistor connected between the output terminal of the DC-DC converter chip and the mobile phone charging interface, the output terminal of the DC-DC converter chip grounded via the fourth and fifth resistors connected in series, the DC-DC converter chip has a feedback terminal connected to a node between the fourth and fifth resistors.

7. The mobile phone charger as claimed in claim 1, wherein the low voltage boosting circuit further comprises:
   sixth to eighth capacitors, the voltage input terminal of the DC step-up chip grounded via the sixth capacitor, a starting capacitor terminal of the DC step-up chip grounded via the seventh capacitor, and the output terminal of the DC step-up chip grounded via the eighth capacitor.

8. The mobile phone charger as claimed in claim 1, wherein the operating voltage of the battery module ranges from 0.3V to 6V.

9. The mobile phone charger as claimed in claim 1, wherein the reference voltage is 1.25V.

10. The mobile phone charger as claimed in claim 5, wherein an inductor is connected between the input terminal of the DC-DC converter chip and the inductance terminal of the DC-DC converter chip.

11. The mobile phone charger as claimed in claim 5, wherein the boosting and charging circuit further comprises:
    first to fifth capacitors, the first capacitor connected between a voltage output terminal of the DC step-up chip and ground, the cathode of the diode grounded via the second capacitor, the charging interface is grounded via the third and the fourth capacitors, the DC-DC converter chip has a reference voltage terminal grounded via the fifth capacitor.

* * * * *